US011321961B2

(12) United States Patent
Jang

(10) Patent No.: US 11,321,961 B2
(45) Date of Patent: May 3, 2022

(54) DATA GENERATION METHOD AND APPARATUS FOR PROVIDING REAL-VIEWING IMMERSION DETERMINATION SERVICE BASED ON IMAGE RECOGNITION

(71) Applicant: INNOPIA TECHNOLOGIES, INC., Gyeonggi-do (KR)

(72) Inventor: Dong-yoon Jang, Gyeonggi-do (KR)

(73) Assignee: INNOPIA TECHNOLOGIES, INC., Gyeonggi-Do (KR)

( * ) Notice: Subject to any disclaimer, the term of this patent is extended or adjusted under 35 U.S.C. 154(b) by 0 days.

(21) Appl. No.: 17/364,662

(22) Filed: Jun. 30, 2021

(65) Prior Publication Data

US 2022/0108103 A1    Apr. 7, 2022

(30) Foreign Application Priority Data

Oct. 6, 2020  (KR) ......................... 10-2020-0128607

(51) Int. Cl.
*G06F 3/01*       (2006.01)
*H04N 21/442*   (2011.01)
(Continued)

(52) U.S. Cl.
CPC ............ *G06V 40/172* (2022.01); *G06F 3/012* (2013.01); *G06F 3/013* (2013.01); *G06V 20/80* (2022.01);
(Continued)

(58) Field of Classification Search
CPC ........... G06K 9/00288; G06K 9/00355; G06K 9/00369; G06K 9/0577;
(Continued)

(56) References Cited

U.S. PATENT DOCUMENTS 8,769,557  B1*  7/2014  Terrazas ........... H04N 21/44231
                                                        725/12
2010/0007601 A1*  1/2010  Lashina .................. G06F 3/013
                                                        345/156
(Continued)

FOREIGN PATENT DOCUMENTS

KR    1020150061716 A    6/2015
KR    1020160091119 A    8/2016
(Continued)

*Primary Examiner* — Kenny A Cese
(74) *Attorney, Agent, or Firm* — Christensen O'Connor Johnson Kindness PLLC

(57) ABSTRACT

Provided is a data generation apparatus including an image reader configured to extract image recognition data by performing image recognition for identifying face, posture, and multitasking of a user viewing an image, and transmit the image recognition data to a score processing unit; the score processing unit configured to apply an additional or deduction point according to a preset conditional value of the additional and deduction point for immersion determination to the image recognition data extracted from the image reader and convert an immersion determination value to a numerical value; an immersion determinator configured to determine an immersion state for each time section based on a preset criterion with respect to the immersion determination value converted by the score processing unit; and a combined data generator configured to combine a user identification (ID), viewing channel information, time information, and an immersion state and generate the same as a data set.

4 Claims, 5 Drawing Sheets

Face-based information identification/ID generation

Absence identification

Posture identification

Multitasking identification

(51) Int. Cl.
  *G06V 40/16* (2022.01)
  *G06V 20/80* (2022.01)
  *G06V 40/20* (2022.01)
  *G06V 40/10* (2022.01)

(52) U.S. Cl.
  CPC ............ *G06V 40/103* (2022.01); *G06V 40/28* (2022.01); *H04N 21/44218* (2013.01); *G06V 40/178* (2022.01)

(58) Field of Classification Search
  CPC .......... G06K 2009/00322; G06F 3/013; G06F 3/012; H04N 21/44218
  See application file for complete search history.

(56) References Cited

U.S. PATENT DOCUMENTS

| | | | | |
|---|---|---|---|---|
| 2012/0164613 A1* | 6/2012 | Jung | ...................... | G06Q 30/02 434/236 |
| 2013/0205314 A1* | 8/2013 | Ramaswamy | ... | H04N 21/44218 725/14 |

FOREIGN PATENT DOCUMENTS

| | | |
|---|---|---|
| KR | 1020170136160 A | 12/2017 |
| KR | 101839827 B1 | 3/2018 |
| KR | 101969050 B1 | 4/2019 |

* cited by examiner

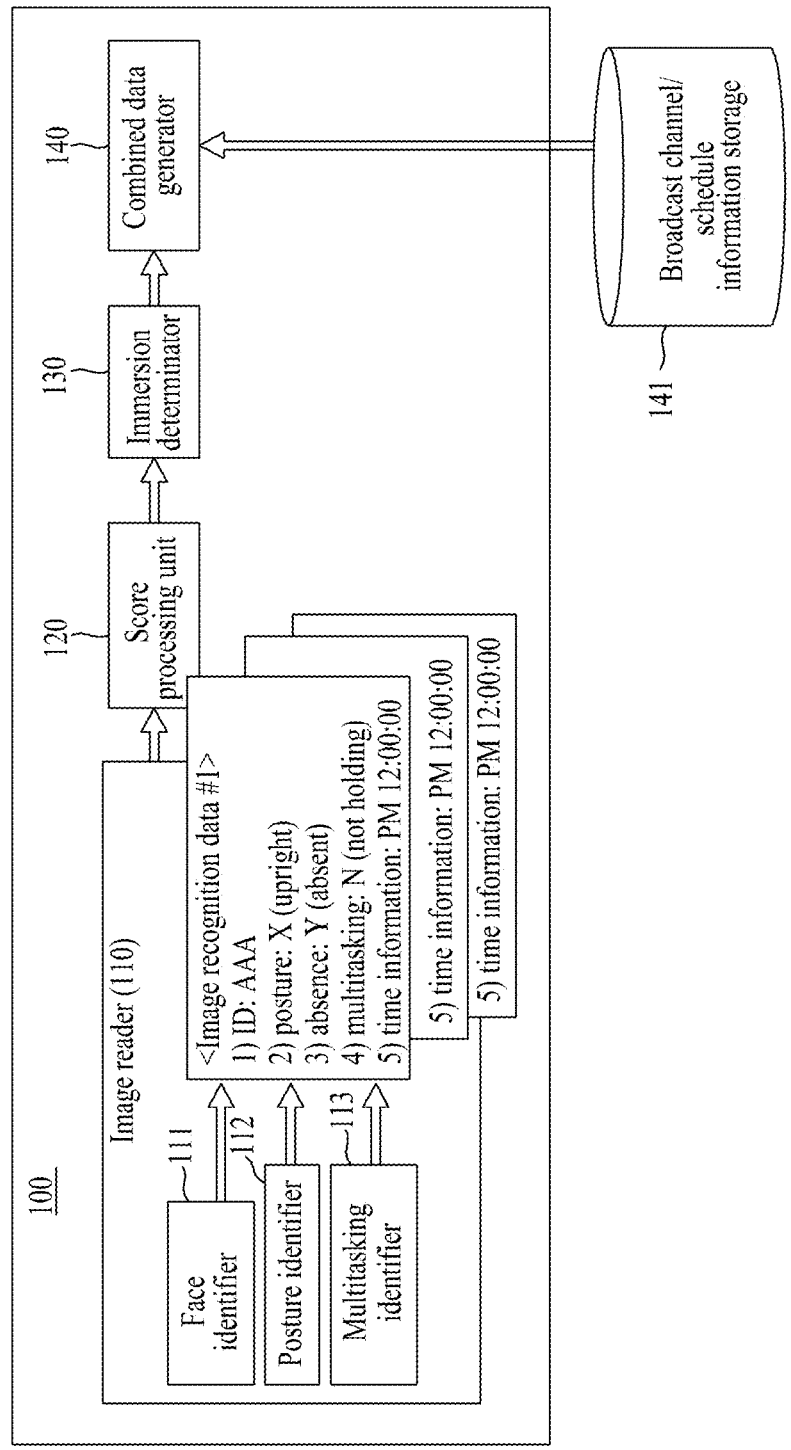

FIG. 2B
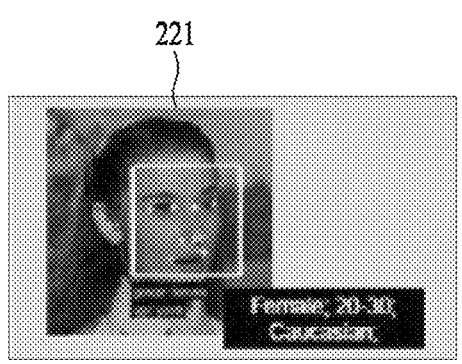
Face-based information
identification/ID generation
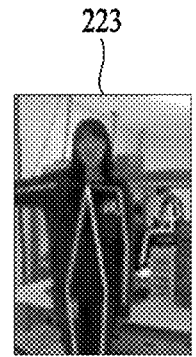
Absence identification
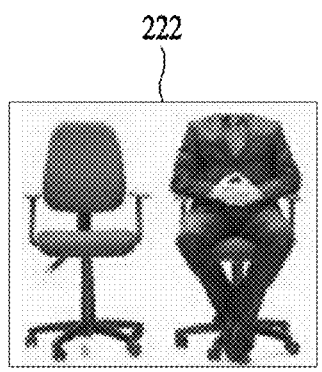
Posture identification
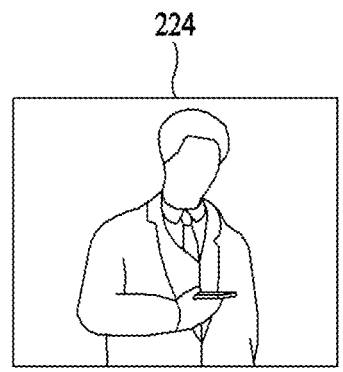
Multitasking identification

DATA GENERATION METHOD AND APPARATUS FOR PROVIDING REAL-VIEWING IMMERSION DETERMINATION SERVICE BASED ON IMAGE RECOGNITION

CROSS-REFERENCE TO RELATED APPLICATION

This application claims the priority benefit of Korean Patent Application No. 10-2020-0128607, filed on Oct. 6, 2020, in the Korean Intellectual Property Office, the disclosure of which is incorporated herein by reference.

BACKGROUND

1. Field of the Invention

The following description of example embodiments relates to a data generation method and apparatus for providing an accurate viewing immersion determination service for each unit viewer based on a camera-based image recognition function and broadcast information.

2. Description of the Related Art

In the case of an audience rating survey device, such as a people meter according to the related art, for example, Korean Patent Registration No. 10-1839827, published on Mar. 13, 2018, and Korean Patent Registration No. 10-1969050, published on Apr. 9, 2019, a rating survey has been conducted in such a manner that each of survey participants directly inputs identity of a corresponding survey participant and a viewing start and end in a manual manner. However, inaccurate survey results may be derived depending on participation activeness of a participant.

For example, although a participant is playing a specific channel on a television (TV), the participant may not be viewing the specific channel or may be absent. If this situation frequently occurs, it is difficult to accurately determine viewing immersion of the participant since it is impossible to distinguish an intense viewing state and a distracted viewing state from each other although the participant is in the distracted viewing state.

Also, in the case of extracting an image and a video captured by a viewer using a camera as is, the risk of privacy invasion may be very high due to leakage and no one might not agree to use such a service.

SUMMARY

Example embodiments provide a data generation method and apparatus that may provide an accurate viewing immersion determination service for each unit viewer based on a camera-based image recognition function and broadcast information, and generate and provide a determination criterion and service data capable of extracting and evaluating viewing state information including immersion without identifying identification information through a camera image recognition.

According to an aspect, there is provided a data generation apparatus for providing a real-viewing immersion determination service based on image recognition, the data generation apparatus including an image reader configured to extract image recognition data by performing image recognition for face identification, posture identification, and multitasking identification of a user viewing an image, and to transmit the extracted image recognition data to a score processing unit; the score processing unit configured to apply an additional point or a deduction point according to a preset conditional value of the additional point and the deduction point for immersion determination to the image recognition data extracted from the image reader and to convert an immersion determination value to a numerical value; an immersion determinator configured to determine an immersion state for each time section based on a preset criterion with respect to the immersion determination value converted by the score processing unit; and a combined data generator configured to combine a user identification (ID), viewing channel information, time information, and an immersion state and to generate the same as a data set.

The image reader includes a face identifier configured to identify a face of the user viewing the image; a posture identifier configured to identify a posture of the user viewing the image; and a multitasking identifier configured to identify multitasking of the user viewing the image.

The face identifier is configured to derive an estimate value for a gender and an age of the user by analyzing and extracting a facial area of the user, to determine presence or absence of a matching ID among prestored IDs, and in response to presence of the matching ID, to recognize the user as an identical user, and in response to absence of the matching ID, to generate a new ID, and to determine that the user is absent if a non-recognition state continues during a preset period of time or more during continuous face identification for the ID and to determine that the user returns to an original position if the user is recognized again in the non-recognition state, and The posture identifier is configured to identify a position of a body portion including an arm, a hand, and a foot through posture analysis of the user by recognizing a joint point of the user, and to determine the posture of the user based on information about a position of the face identified by the face identifier and information about the position of the body portion identified by the posture identifier.

The multitasking identifier is configured to identify an object corresponding to a user terminal in an area in which image reading is ongoing, to determine whether the identified object is a user terminal of a corresponding user through information linkage between the face identifier and the posture identifier, to determine whether the user is using the user terminal and, when the user is determined to be using the user terminal, to determine a corresponding state as a multitasking state.

The score processing unit is configured to apply a preset deduction point to image recognition data corresponding to a state in which immersion of the user is not intense and to apply a preset additional point to image recognition data corresponding to a state in which the immersion of the user is intense based on the image recognition data determined by the face identifier, the posture identifier, and the multitasking identifier of the image reader and to convert the immersion of the user to the immersion determination value.

The immersion determinator is configured to classify the immersion determination value converted by the score processing unit based on a preset criterion and to determine an immersion state including an intense viewing, a normal viewing, and a distracted viewing.

The combined data generator is configured to combine, into a single set, an ID of the user viewing the image, time information about a time at which the user is viewing the image, an immersion state determined through the immersion determinator, and viewing channel information stored in a broadcast channel and schedule information storage per preset time unit and generate the same as a data set, and to generate and visualize cumulative data for each ID.

According to an aspect, there is provided a data generation method for providing a real-viewing immersion determination service based on image recognition, the data generation method including extracting, using an image reader, image recognition data by performing image recognition for face identification, posture identification, and multitasking identification of a user viewing an image, and transmitting the extracted image recognition data to a score processing unit; applying, using the score processing unit, an additional point or a deduction point according to a preset conditional value of the additional point and the deduction point for immersion determination to the image recognition data extracted from the image reader and converting an immersion determination value to a numerical value; determining, using an immersion determinator, an immersion state for each time section based on a preset criterion with respect to the immersion determination value converted by the score processing unit; and combining, using a combined data generator, a user ID, viewing channel information, time information, and an immersion state and generating the same as a data set.

According to some example embodiments, it is possible to generate determination and default data for providing an accurate viewing immersion determination service for each unit viewer based on a camera-based image recognition function and broadcast information. Also, it is possible to generate a determination criterion and service data capable of extracting and evaluating viewing state information including immersion without identifying identification information through a camera image recognition.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 1 illustrates a configuration of a data generation apparatus for providing a real-viewing immersion determination service based on image recognition according to an example embodiment;

FIGS. 2A, 2B, and 2C illustrate examples of a data generation process for providing a real-viewing immersion determination service based on image recognition according to an example embodiment.

DETAILED DESCRIPTION

Figure 2A:

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other components). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, example embodiments will be described with reference to the accompanying drawings.

FIG. 1 illustrates a configuration of a data generation apparatus for providing a real-viewing immersion determination service based on image recognition according to an example embodiment.

Referring to FIG. 1, a data generation apparatus 100 for providing a real-viewing immersion determination service based on image recognition includes an image reader 110, a score processing unit 120, an immersion determinator 130, and a combined data generator 140.

The image reader 110 may extract image recognition data by performing image recognition for face identification, posture identification, and multitasking identification of a user viewing an image, and may transmit the extracted image recognition data to the score processing unit 120.

The image reader 110 includes a face identifier 111, a posture identifier 112, and a multitasking identifier 113.

The face identifier 111 identifies a face of the user viewing the image. The face identifier 111 derives an estimate value for a gender and an age of the user by analyzing and extracting a facial area of the user. The face identifier 111 analyzes the identified face and determines whether the face matches a prestored ID, and in response to presence of the matching ID, recognizes the corresponding user as an identical user and in response to absence of the matching ID, generates and stores a new ID.

If a non-recognition state continues during a preset period of time or more during continuous face identification for the ID, the face identifier 111 determines that the user is absent during viewing. If the user is recognized again in the non-recognition state, the face identifier 111 determines that the user returns to an original position for viewing.

The posture identifier 112 identifies a position of the user viewing the image. The posture identifier 112 identifies a position of a body portion including an arm, a hand, and a foot through posture analysis of the user by recognizing a joint point of the user. The posture identifier 112 determines the posture of the user based on information about a position of the face identified by the face identifier 111 and information about the position of the body portion identified by the posture identifier 112.

As described above, it is possible to measure a number of times that the user is absent and an amount of time in which the user is absent using the face identifier 111 and to identify an image viewing posture of the user that includes viewing with an upright posture and viewing with a lying-down posture using the posture identifier 112.

The multitasking identifier 113 identifies multitasking of the user viewing the image. The multitasking identifier 113 identifies an object corresponding to a user terminal in an area in which image reading is ongoing, and determines whether the identified object is a user terminal of a corresponding user through information linkage between the face identifier 111 and the posture identifier 112. That is, the multitasking identifier 113 may determine whether the user has the user terminal, for example, a smartphone, a tablet, a personal computer (PC), and a laptop while viewing the image. In response to presence of the corresponding user terminal in the area in which image reading is ongoing, the multitasking identifier 113 determines whether the user is using the user terminal and, when the user is determined to be using the user terminal, determines a corresponding state as a multitasking state.

Referring to FIG. 1, the image reader 110 transmits, to the score processing unit 120, image recognition data that includes an ID, posture, absence, multitasking, and time information identified through the face identifier 111, the posture identifier 112, and the multitasking identifier 113 of the image reader 110.

An individual image recognition model, such as face identification, posture identification, and multitasking identification, may be selected from among various existing image recognition frameworks/models, that is, open sources and company solutions, based on demand accuracy and service purpose, and may be introduced and used, such as, for example, RCNN, you only look once (YOLO), a single shot detector (SDD), and an attention net.

The score processing unit 120 applies an additional point or a deduction point according to a preset conditional value of the additional point and the deduction point for immersion determination to the image recognition data extracted from the image reader 110 and converts an immersion determination value to a numerical value.

The score processing unit 120 applies a preset deduction point to image recognition data corresponding to a state in which immersion of the user is not intense and applies a preset additional point to image recognition data corresponding to a state in which the immersion of the user is intense based on the image recognition data determined by the face identifier 111, the posture identifier 112, and the multitasking identifier 113 of the image reader 110, and then converts the immersion of the user to the immersion determination value.

For example, it is assumed that an initial immersion determination value is given as 10 points. If an absence state is identified through the face identifier 111, a deduction point may be applied to the immersion determination value based on a number of times that the user is absent and an amount of time in which the user is absent.

Also, if the user is identified to be in an upright posture through the posture identifier 112, the score processing unit 120 may apply an additional point to the immersion determination value. If the user is identified to be in a lying-down posture, the score processing unit 120 may apply a deduction point to the immersion determination value.

Also, if the user is identified to be in a multitasking state through the multitasking identifier 113, the score processing unit 120 may apply a deduction point to the immersion determination value.

As described above, the score processing unit 120 may determine, as the immersion determination value, a numerical value finally acquired by applying the additional point or the deduction point to the initial immersion determination value.

The immersion determinator 130 determines an immersion state for each time section based on a preset criterion with respect to the immersion determination value converted by the score processing unit 120.

The immersion determinator 130 classifies the immersion determination value converted by the score processing unit 120 based on a preset criterion and determines an immersion state including an intense viewing, a normal viewing, a distracted viewing, and a non-viewing.

The combined data generator 140 combines a user identification (ID), viewing channel information, time information, and an immersion state and generates the same as a data set.

The combined data generator 140 generates the data set by combining, into a single set, an ID of the user viewing the image identified through the image reader 110, time information about a time in which the user is viewing the image, the immersion state determined through the immersion determinator 130, and viewing channel information stored in a broadcast channel and schedule information storage 141 per preset time unit, and generates and visualizes cumulative data for each ID.

For example, the combined data generator 140 may combine ID-time information-channel name-program name-immersion determination value and thereby generate the same as a single data set. Hereinafter, a data generation process for providing a real-viewing immersion determination service based on image recognition according to an example embodiment is further described.

Figure 2C:
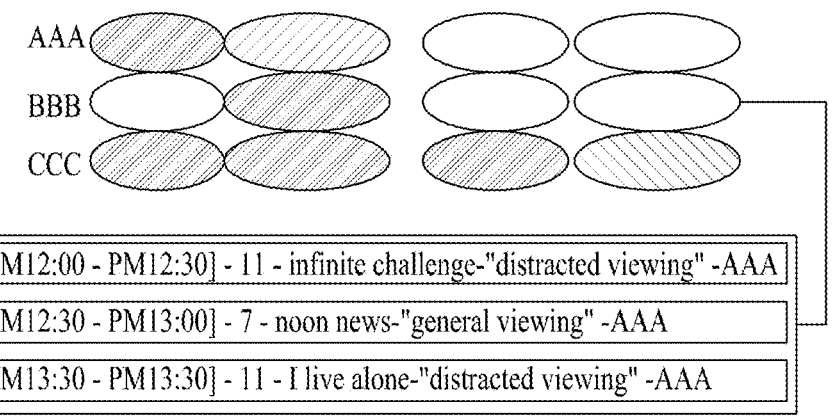

FIGS. 2A, 2B, and 2C illustrate examples of a data generation process for providing a real-viewing immersion determination service based on image recognition according to an example embodiment.

The data generation process for providing the real-viewing immersion determination service based on image recognition according to an example embodiment may identify a user in an area in which image reading is performed through an image reader. Here, the user may be absent in the area or at least one user may be present in the area. Referring to FIG. 2A, a plurality of users 211, a single sitting and viewing user 212, or a single lying down and viewing user 213 may be identified through the image reader.

Through the image reader, Image recognition data is extracted by performing image recognition for face identification, posture identification, and multitasking identification of a user viewing an image and the extracted image recognition data is transmitted to a score processing unit.

The image reader includes a face identifier, a posture identifier, and a multitasking identifier.

Referring to FIG. 2B, the face identifier identifies a face of a user viewing an image (221). The face identifier derives an estimate value for a gender and an age of the user by analyzing and extracting a facial area of the user. The face identifier analyzes the identified face and determines whether the face matches a prestored ID, and in response to presence of the matching ID, recognizes the corresponding user as an identical user and in response to absence of the matching ID, generates and stores a new ID.

For example, if the user viewing the image is determined to match a prestored ID AAA as a result of analyzing the identified face, the face identifier performs immersion determination on the ID AAA. Here, the ID AAA is estimated that a gender is a male and an age is in the range of 35 to 45.

If a non-recognition state continues during a preset period of time or more during continuous face identification for the ID, the face identifier determines that the user is absent during viewing. If the user is recognized again in the non-recognition state, the face identifier 111 determines that the user returns to an original position for viewing (222).

Referring again to FIG. 2B, the posture identifier identifies a position of the user viewing the image (223). The posture identifier identifies a position of a body portion including an arm, a hand, and a foot through posture analysis of the user by recognizing a joint point of the user. The posture identifier determines the posture of the user based on information about a position of the face identified by the face identifier and information about the position of the body portion identified by the posture identifier.

As described above, it is possible to measure a number of times that the user is absent and an amount of time in which the user is absent using the face identifier and to identify an image viewing posture of the user that includes viewing with an upright posture and viewing with a lying-down posture using the posture identifier.

Referring again to FIG. 2B, the multitasking identifier identifies multitasking of the user viewing the image (224). The multitasking identifier identifies an object corresponding to a user terminal in an area in which image reading is ongoing, and determines whether the identified object is a user terminal of a corresponding user through information linkage between the face identifier and the posture identifier. That is, the multitasking identifier may determine whether the user has the user terminal, for example, a smartphone, a tablet, a PC, and a laptop while viewing the image. In response to presence of the corresponding user terminal in the area in which image reading is ongoing, the multitasking identifier determines whether the user is using the user terminal and, when the user is determined to be using the user terminal, determines a corresponding state as a multitasking state.

The image reader transmits, to the score processing unit, image recognition data that includes ID, posture, absence, multitasking, and time information identified by the face identifier, the posture identifier, and the multitasking identifier of the image reader.

The score processing unit applies an additional point or a deduction point according to a preset conditional value of the additional point and the deduction point for immersion determination to the image recognition data extracted from the image reader and converts an immersion determination value to a numerical value.

The score processing unit applies a preset deduction point to image recognition data corresponding to a state in which immersion of the user is not intense and applies a preset additional point to image recognition data corresponding to a state in which the immersion of the user is intense based on the image recognition data determined by the face identifier, the posture identifier, and the multitasking identifier of the image reader, and then converts the immersion of the user to the immersion determination value.

For example, it is assumed that an initial immersion determination value is given as 10 points. If an absence state is identified through the face identifier, a deduction point may be applied to the immersion determination value based on a number of times that the user is absent and an amount of time in which the user is absent.

Also, if the user is identified to be in an upright posture through the posture identifier, the score processing unit may apply an additional point to the immersion determination value. If the user is identified to be in a lying-down posture, the score processing unit may apply a deduction point to the immersion determination value.

Also, if the user is identified to be in a multitasking state through the multitasking identifier, the score processing unit may apply a deduction point to the immersion determination value.

According to an example embodiment, with the assumption that an ID AAA is applied with deduction points including −1 point for determination as a lying-down posture, −1 point for determination as holding a smartphone, and −3 points (−1 point for each absence, −1*3) for determination as three times of absence. Accordingly, a final immersion determination value may be represented as 5 points.

As described above, the score processing unit may determine, as the immersion determination value, a numerical value finally acquired by applying the additional point or the deduction point to the initial immersion determination value.

The immersion determinator determines an immersion state for each time section based on a preset criterion with respect to the immersion determination value converted by the score processing unit.

The immersion determinator classifies the immersion determination value converted by the score processing unit based on a preset criterion and determines an immersion state including an intense viewing, a normal viewing, a distracted viewing, and a non-viewing.

For example, the immersion determinator determines a corresponding immersion state as an intense viewing state if the immersion determination value corresponds to 10~8, determines the immersion state as a normal viewing state if the immersion determination value corresponds to 7~6, and determines the immersion state as a distracted viewing state if the immersion determination value corresponds to 5~1. According to the example embodiment, the ID AAA may be determined to be in the distracted viewing state since the immersion determination value is 5 points.

The combined data generator combines a user ID, viewing channel information, time information, and an immersion state and generates the same as a data set.

The combined data generator generates the data set by combining, into a single set, an ID of the user viewing the image identified through the image reader, time information about a time in which the user is viewing the image, the immersion state determined through the immersion determinator, and viewing channel information stored in a broadcast channel and schedule information storage per preset time unit, for example, every 1 minute, and generates and visualizes cumulative data for each ID.

For example, referring to FIG. 2C, the combined data generator may generate "predetermined time interval-channel name-program name-immersion state-ID" as a single data set. The combined data generator may visualize the generated data set by classify an intense viewing, a normal viewing, a distracted viewing, and a non-viewing by color for each time zone for each ID, for example, AAA, BBB, and CCC.

Figure 3:
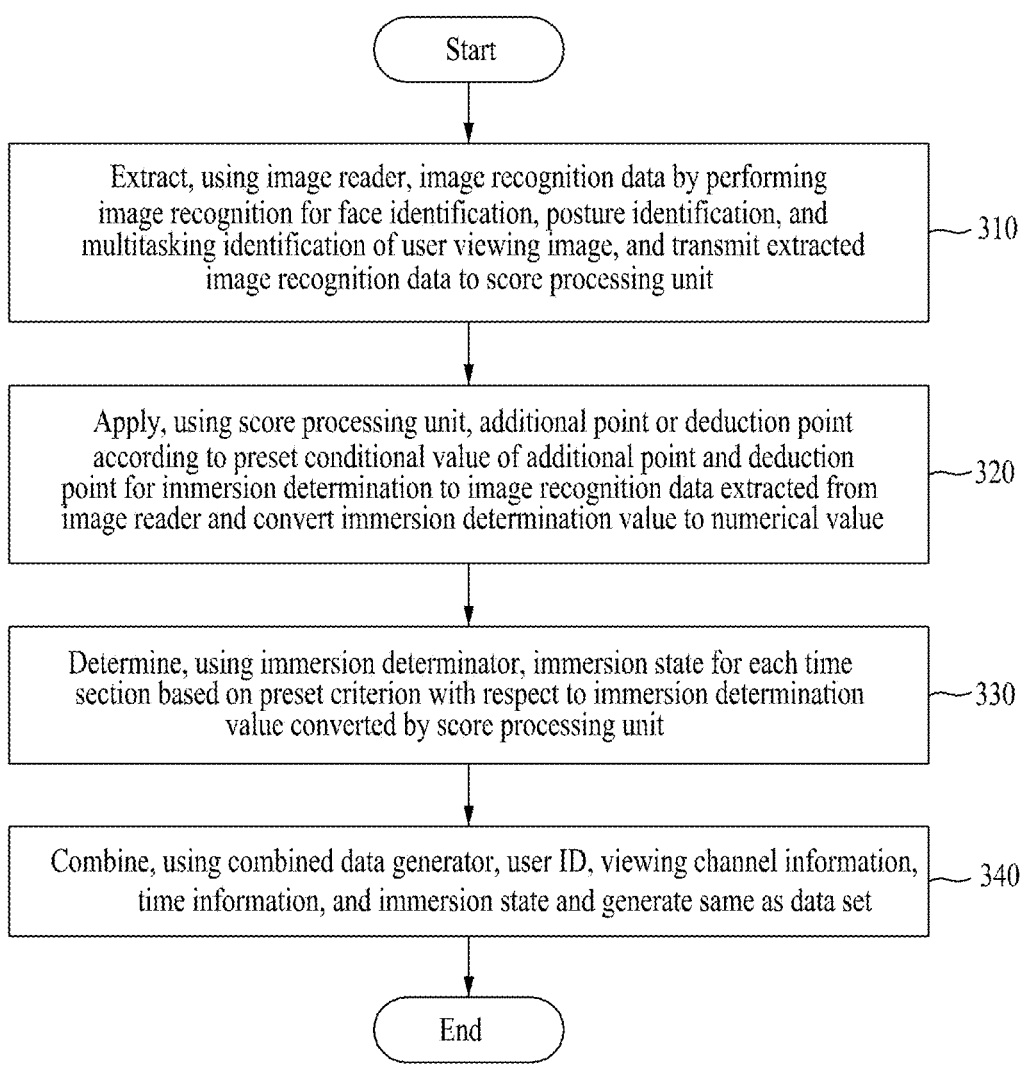
FIG. 3 is a flowchart illustrating an example of a data generation method for providing a real-viewing immersion determination service based on image recognition according to an example embodiment.

FIG. 3 is a flowchart illustrating an example of a data generation method for providing a real-viewing immersion determination service based on image recognition according to an example embodiment.

The data generation method for providing the real-viewing immersion determination service based on image recognition includes operation 5310 of extracting, using an image reader, image recognition data by performing image recognition for face identification, posture identification, and multitasking identification of a user viewing an image, and transmitting the extracted image recognition data to a score processing unit, operation 320 of applying, using the score processing unit, an additional point or a deduction point according to a preset conditional value of the additional point and the deduction point for immersion determination to the image recognition data extracted from the image reader and converting an immersion determination value to a numerical value, operation 330 of determining, using an immersion determinator, an immersion state for each time section based on a preset criterion with respect to the immersion determination value converted by the score processing unit, and operation 340 of combining, using a combined data generator, a user ID, viewing channel information, time information, and an immersion state and generating the same as a data set.

In operation 310, the image reader extracts image recognition data by performing image recognition for face identification, posture identification, and multitasking identification of the user viewing the image, and transmits the extracted image recognition data to the score processing unit.

The image reader includes a face identifier, a posture identifier, and a multitasking identifier.

The face identifier identifies a face of a user viewing an image. The face identifier derives an estimate value for a gender and an age of the user by analyzing and extracting a facial area of the user. The face identifier analyzes the identified face and determines whether the face matches a prestored ID, and in response to presence of the matching ID, recognizes the corresponding user as an identical user and in response to absence of the matching ID, generates and stores a new ID.

If a non-recognition state continues during a preset period of time or more during continuous face identification for the ID, the face identifier determines that the user is absent during viewing. If the user is recognized again in the non-recognition state, the face identifier determines that the user returns to an original position for viewing.

The posture identifier identifies a position of the user viewing the image. The posture identifier identifies a position of a body portion including an arm, a hand, and a foot through posture analysis of the user by recognizing a joint point of the user. The posture identifier determines the posture of the user based on information about a position of the face identified by the face identifier and information about the position of the body portion identified by the posture identifier.

As described above, it is possible to measure a number of times that the user is absent and an amount of time in which the user is absent using the face identifier and to identify an image viewing posture of the user that includes viewing with an upright posture and viewing with a lying-down posture using the posture identifier.

The multitasking identifier identifies multitasking of the user viewing the image. The multitasking identifier identifies an object corresponding to a user terminal in an area in which image reading is ongoing, and determines whether the identified object is a user terminal of a corresponding user through information linkage between the face identifier and the posture identifier. That is, the multitasking identifier may determine whether the user has the user terminal, for example, a smartphone, a tablet, a PC, and a laptop while viewing the image. In response to presence of the corresponding user terminal in the area in which image reading is ongoing, the multitasking identifier determines whether the user is using the user terminal and, when the user is determined to be using the user terminal, determines a corresponding state as a multitasking state.

Image recognition data that includes an ID, posture, absence, multitasking, and time information identified through the face identifier, the posture identifier, and the multitasking identifier of the image reader is transmitted to the score processing unit.

An individual image recognition model, such as face identification, posture identification, and multitasking identification, may be selected from among various existing image recognition frameworks/models, that is, open sources and company solutions, based on demand accuracy and service purpose, and may be introduced and used, such as, for example, RCNN, YOLO, an SDD, and an attention net.

In operation 320, the score processing unit applies an additional point or a deduction point according to a preset conditional value of the additional point and the deduction point for immersion determination to the image recognition data extracted from the image reader 110 and converts an immersion determination value to a numerical value.

The score processing unit applies a preset deduction point to image recognition data corresponding to a state in which immersion of the user is not intense and applies a preset additional point to image recognition data corresponding to a state in which the immersion of the user is intense based on the image recognition data determined by the face identifier, the posture identifier, and the multitasking identifier of the image reader, and then converts the immersion of the user to the immersion determination value.

For example, it is assumed that an initial immersion determination value is given as 10 points. If an absence state is identified through the face identifier, a deduction point may be applied to the immersion determination value based on a number of times that the user is absent and an amount of time in which the user is absent.

Also, if the user is identified to be in an upright posture through the posture identifier, the score processing unit may apply an additional point to the immersion determination value. If the user is identified to be in a lying-down posture, the score processing unit may apply a deduction point to the immersion determination value.

Also, if the user is identified to be in a multitasking state through the multitasking identifier, the score processing unit may apply a deduction point to the immersion determination value.

As described above, the score processing unit may determine, as the immersion determination value, a numerical value finally acquired by applying the additional point or the deduction point to the initial immersion determination value.

In operation 330, the immersion determinator determines an immersion state for each time section based on a preset criterion with respect to the immersion determination value converted by the score processing unit.

The immersion determinator classifies the immersion determination value converted by the score processing unit based on a preset criterion and determines an immersion state including an intense viewing, a normal viewing, a distracted viewing, and a non-viewing.

In operation 340, the combined data generator combines a user ID, viewing channel information, time information, and an immersion state and generates the same as a data set.

The combined data generator generates the data set by combining, into a single set, an ID of the user viewing the image identified through the image reader, time information about a time in which the user is viewing the image, the immersion state determined through the immersion determinator, and viewing channel information stored in a broadcast channel and schedule information storage per preset time unit, and generates and visualizes cumulative data for each ID.

For example, the combined data generator may combine ID-time information-channel name-program name-immersion determination value and thereby generate the same as a single data set.

According to some example embodiments, it is possible to generate determination and default data for providing an accurate viewing immersion determination service for each unit viewer based on a camera-based image recognition function and broadcast information. Also, it is possible to generate a determination criterion and service data capable of extracting and evaluating viewing state information including immersion without identifying identification information through a camera image recognition.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, virtual equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A data generation apparatus for providing an immersion determination service, the data generation apparatus comprising:
an image reader configured to extract image recognition data by performing image recognition for face identification, posture identification, and multitasking identification of a user viewing an image, and to transmit the extracted image recognition data to a score processing unit;
the score processing unit configured to apply an additional point or a deduction point according to a preset conditional value of the additional point and the deduction point for immersion determination to the image recognition data extracted by the image reader and to convert an immersion determination value to a numerical value;
an immersion determinator configured to determine an immersion state based on a preset criterion with respect to the immersion determination value converted by the score processing unit; and
a combined data generator configured to combine a user identification (ID), viewing channel information, time information, and an immersion state and to generate a data set,
wherein the image reader comprises:
a face identifier configured to identify a face of the user viewing the image and to determine whether the user is absent;

a posture identifier configured to identify a posture of the user viewing the image; and a multitasking identifier configured to identify multitasking of the user viewing the image, and the multitasking identifier is configured to identify an object corresponding to a user terminal in an area in which image reading is ongoing, to determine whether the identified object is a user terminal of a corresponding user through information linkage between the face identifier and the posture identifier to determine whether the user has the user terminal while viewing the image, and, in response to presence of the corresponding user terminal in the area in which image reading is ongoing, to determine whether the user is using the user terminal and, when the user is determined to be using the user terminal, to determine a corresponding state as a multitasking state, and the combined data generator is configured to generate the data set as a single set that comprises an ID of the user viewing the image, time information about a time at which the user is viewing the image, an immersion state determined through the immersion determinator, viewing channel information stored in a broadcast channel and schedule information storage, and program information per preset time unit, wherein the score processing unit is configured to apply one or more preset deduction points to image recognition data corresponding to a first viewing state and to apply a preset additional point to image recognition data corresponding to a second viewing state based on the image recognition data determined by the face identifier, the posture identifier, and the multitasking identifier of the image reader and to convert the immersion of the user to the immersion determination value, wherein the applying of the one or more preset deduction points to the image recognition data corresponding to the first viewing state is based on a number of times that the user is absent and an amount of time in which the user is absent, and wherein the immersion determinator is configured to classify the immersion determination value converted by the score processing unit based on a preset criterion.

2. The data generation apparatus of claim 1, wherein the face identifier is configured to derive an estimate value for a gender and an age of the user by analyzing and extracting a facial area of the user, to determine presence or absence of a matching ID among prestored IDs, and in response to presence of the matching ID, to recognize the user as an identical user, and in response to absence of the matching ID, to generate a new ID, and to determine that the user is absent if a non-recognition state continues during a preset period of time or more during continuous face identification for the ID and to determine that the user returns to an original position if the user is recognized again in the non-recognition state, and the posture identifier is configured to identify a position of a body portion comprising an arm, a hand, and a foot through posture analysis of the user by recognizing a joint point of the user, and to determine the posture of the user based on information about a position of the face identified by the face identifier and information about the position of the body portion identified by the posture identifier.

3. A data generation method for providing an immersion determination service, the data generation method comprising:

extracting, using an image reader, image recognition data by performing image recognition for face identification, posture identification, and multitasking identification of a user viewing an image, and transmitting the extracted image recognition data to a score processing unit;

applying, using the score processing unit, an additional point or a deduction point according to a preset conditional value of the additional point and the deduction point for immersion determination to the image recognition data extracted from the image reader and converting an immersion determination value to a numerical value;

determining, using an immersion determinator, an immersion state based on a preset criterion with respect to the immersion determination value converted by the score processing unit; and combining, using a combined data generator, a user identification (ID), viewing channel information, time information, and an immersion state and generating a data set, in the extracting of the image recognition data and the transmitting of the extracted image recognition data, the image reader comprises a face identifier configured to identify a face of a user viewing the image and to determine whether the user is absent, a posture identifier configured to identify a posture of the user viewing the image, and a multitasking identifier configured to identify multitasking of the user viewing the image, and the multitasking identifier is configured to identify an object corresponding to a user terminal in an area in which image reading is ongoing, to determine whether the identified object is a user terminal of a corresponding user through information linkage between the face identifier and the posture identifier to determine whether the user has the user terminal while viewing the image, and, in response to presence of the corresponding user terminal in the area in which image reading is ongoing, to determine whether the user is using the user terminal and, when the user is determined to be using the user terminal, to determine a corresponding state as a multitasking state, and the combining and the generating of the data set comprises generating the data set as a single set that comprises an ID of the user viewing the image, time information about a time at which the user is viewing the image, an immersion state determined through the immersion determinator, viewing channel information stored in a broadcast channel and schedule information storage, and program information per preset time unit, wherein the score processing unit applies one or more preset deduction points to image recognition data corresponding to a first viewing state and applies a preset additional point to image recognition data corresponding to a second viewing state based on the image recognition data determined by the face identifier, the posture identifier, and the multitasking identifier of the image reader and to convert the immersion of the user to the immersion determination value, wherein the applying of the one or more preset deduction points to the image recognition data corresponding to the first viewing state is based on a number of times that the user is absent and an amount of time in which the user is absent, and wherein the immersion determinator classifies the immersion determination value converted by the score processing unit based on a preset criterion.

4. The data generation method of claim 3, wherein the face identifier is configured to derive an estimate value for a gender and an age of the user by analyzing and extracting a facial area of the user, to determine presence or absence of a matching ID among prestored IDs, and in response to presence of the matching ID, to recognize the user as an identical user, and in response to absence of the matching ID, to generate a new ID, and to determine that the user is absent if a non-recognition state continues during a preset period of time or more during continuous face identification for the ID and to determine that the user returns to an original position if the user is recognized again in the nonrecognition state, and the posture identifier is configured to identify a position of a body portion comprising an arm, a hand, and a foot through posture analysis of the user by recognizing a joint point of the user, and to determine the posture of the user based on information about a position of the face identified by the face identifier and information about the position of the body portion identified by the posture identifier.

* * * * *